United States Patent
Gao et al.

(10) Patent No.: US 10,936,386 B2
(45) Date of Patent: Mar. 2, 2021

(54) METHOD, DEVICE AND COMPUTER PROGRAM PRODUCT FOR MONITORING ACCESS REQUEST

(71) Applicant: EMC IP Holding Company LLC, Hopkinton, MA (US)

(72) Inventors: Wayne Gao, Shanghai (CN); Gary Jialei Wu, Shanghai (CN); Kang Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/457,089

(22) Filed: Jun. 28, 2019

(65) Prior Publication Data

US 2020/0250019 A1    Aug. 6, 2020

(30) Foreign Application Priority Data

Feb. 1, 2019  (CN) .......................... 201910105769.2

(51) Int. Cl.
*G06F 9/54*      (2006.01)
*G06F 11/30*     (2006.01)
*G06F 11/34*     (2006.01)
*H04L 29/08*     (2006.01)

(52) U.S. Cl.
CPC ............ *G06F 9/545* (2013.01); *G06F 11/302* (2013.01); *G06F 11/3476* (2013.01); *H04L 67/36* (2013.01)

(58) Field of Classification Search
CPC ........ G06F 11/302; G06F 11/34; G06F 9/545; H04L 67/36
See application file for complete search history.

(56) References Cited

U.S. PATENT DOCUMENTS

| | | | |
|---|---|---|---|
| 2005/0177776 A1* | 8/2005 | Kim .................... | G06F 11/0715 714/38.13 |
| 2007/0088974 A1* | 4/2007 | Chandwani ......... | G06F 11/0781 714/6.11 |
| 2007/0242678 A1* | 10/2007 | Fu .......................... | H04L 25/49 370/395.62 |
| 2012/0278194 A1* | 11/2012 | Dewan ............... | G06Q 30/0205 705/26.1 |
| 2013/0332723 A1* | 12/2013 | Tan ..................... | H04L 63/0807 713/150 |
| 2013/0339632 A1* | 12/2013 | Yamashita .......... | G06F 11/1484 711/148 |
| 2017/0134258 A1* | 5/2017 | Kumar .................... | H04L 41/12 |
| 2017/0177697 A1* | 6/2017 | Lee ......................... | H04L 67/10 |
| 2017/0262172 A1* | 9/2017 | Xu ......................... | G06F 16/188 |
| 2017/0374502 A1* | 12/2017 | Gabel .................. | G06Q 50/188 |
| 2018/0314148 A1* | 11/2018 | Tetiker ..................... | G03F 1/36 |

\* cited by examiner

*Primary Examiner* — Tuan C Dao

(74) *Attorney, Agent, or Firm* — Amin, Turocy & Watson, LLP

(57) ABSTRACT

Techniques for monitoring an access request are described. For instance, a method comprises: obtaining a request parameter indicating a target storage space to which the access request is directed; determining a target address range of the target storage space based on the request parameter; determining, in a set of kernel logs, a target kernel log associated with the access request based on the target address range, the set of kernel logs recording operations that occur in a kernel of an operating system; and determining information of an operation of the access request based on the kernel log, the operation corresponding to the target kernel log.

20 Claims, 5 Drawing Sheets

METHOD, DEVICE AND COMPUTER PROGRAM PRODUCT FOR MONITORING ACCESS REQUEST

RELATED APPLICATION

The present application claims the benefit of priority to Chinese Patent Application No. 201910105769.2, filed on Feb. 1, 2019, which application is hereby incorporated into the present application by reference herein in its entirety.

FIELD

Embodiments of the present disclosure relate to the field of computers, and more specifically to a method, a device and a computer program product for monitoring an access request.

BACKGROUND

With development of computer technologies, distributed computing is more and more used in various industries. More and more attention has been paid to implementation of applications in distributed systems. However, developers usually can only obtain a log file of an access request at application level, and it is difficult for the developers to know information of execution of the applications in a system kernel. As a result, it is difficult for the developers to troubleshoot possible failures according to a kernel log. Therefore, how to effectively monitor the implementation of the applications in the system kernel has become a focus of attention at present.

SUMMARY

Embodiments of the present disclosure provide a solution for monitoring an access request.

According to a first aspect of the present disclosure, there is provided a method of monitoring an access request. The method comprises: obtaining a request parameter indicating a target storage space to which the access request is directed; determining a target address range of the target storage space based on the request parameter; determining, in a set of kernel logs a target kernel log associated with the access request based on the target address range, the set of kernel logs recording operations that occur in a kernel of an operating system; and determining information of an operation of the access request based on the kernel log, the operation corresponding to the target kernel log.

According to a second aspect of the present disclosure, there is provided a device of monitoring an access request. The device comprises: at least one processing unit; at least one memory coupled to the at least one processing unit and having instructions stored therein. The instructions, when executed by the at least one processing unit, causing the device to perform acts comprising: obtaining a request parameter indicating a target storage space to which the access request is directed; determining a target address range of the target storage space based on the request parameter; determining, in a set of kernel logs, a target kernel log associated with the access request based on the target address range, the set of kernel logs recording operations that occur in a kernel of an operating system; and determining information of an operation of the access request based on the kernel log, the operation corresponding to the target kernel log.

According to a third aspect of the present disclosure, there is provided a computer program product being stored on a non-transitory computer storage medium and comprising machine-executable instructions. The machine-executable instructions, when executed in a device, cause the device to perform any step of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

DETAILED DESCRIPTION OF EMBODIMENTS

Figure 1:
FIG. 1 illustrates a diagram of architecture of an example kernel according to an embodiment of the present disclosure.

Various embodiments of the present disclosure will be described as follows in greater detail with reference to the drawings. Although various embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

As stated above, access requests with high latency may occur in a distributed computing system. Existing monitoring systems (such as Zipkin™ and Zabbix®) can only obtain application logs or some system logs, but are not able to monitor an entire life cycle of a specific request of an application from a user application program to system kernel space.

However, reasons for causing latency of access requests to become larger generally include not only problems in an application layer, but also problems in a kernel layer. For example, the user application schedules is slow, a kernel has too many processes, hot disks, bad disks, network failures and so on. All of these failures in the kernel layer might lead to access requests with high latency.

FIG. 1 illustrates a diagram of architecture of an example kernel 100 according to an embodiment of the present disclosure. As shown in FIG. 1, the kernel 100 may include a plurality of layers: a virtual file system layer 110, a file system layer 120, a page cache 130, a generic block layer 140, an I/O scheduler layer 150, a block device driver layer 160, and a block device layer 170. For example, when a system call of a read request is received, the read request needs to go through the virtual file system layer 110, and the virtual file system layer 110 will determine whether target data is located in the page cache 130 through the file system layer 120, thereby determining whether to read data directly from the page cache 130 or read data from a driver. For a read request missed by the page cache 130, the kernel uses a mapping to obtain a physical address on a target block. Subsequently, the kernel performs a read operation through the generic block layer 140, to convert the read operation for the target data into a block read request for a unit storage block. The I/O scheduler layer 150 may accept an I/O request and attempt to merge adjacent block read requests and call the block device driver layer 160 to process the read request on the block device layer 170.

Existing monitoring systems (such as Zipkin™) are unable to correlate kernel logs in the kernel to a specific access request, which makes it unable to obtain execution information of the request in various layers of the example kernel 100. Therefore, it is difficult for the existing monitoring systems to provide monitoring of an entire life cycle for the access request.

According to an embodiment of the present disclosure, there is provided a solution for deploying a machine learning model. In this solution, a request parameter indicating a target storage space to which the access request is directed may be obtained, and the request parameter may be used to determine a target address range of the target storage space. Subsequently, a target kernel log associated with the access request may be determined in a set of kernel logs based on the target address range, where the set of kernel logs records operations that occur in a kernel of an operating system. Subsequently, information of an operation of the access request may be determined based on the kernel log, where the operation corresponds to the target kernel log. By using the request parameter to identify the kernel log corresponding to the access request, execution details of the access request in the kernel are obtained; thereby providing a basis for analyzing whether an abnormity occurs in the operation of the access request is the kernel.

Basic principles and several example implementations of the present disclosure are described below with reference to figures.

Figure 2:
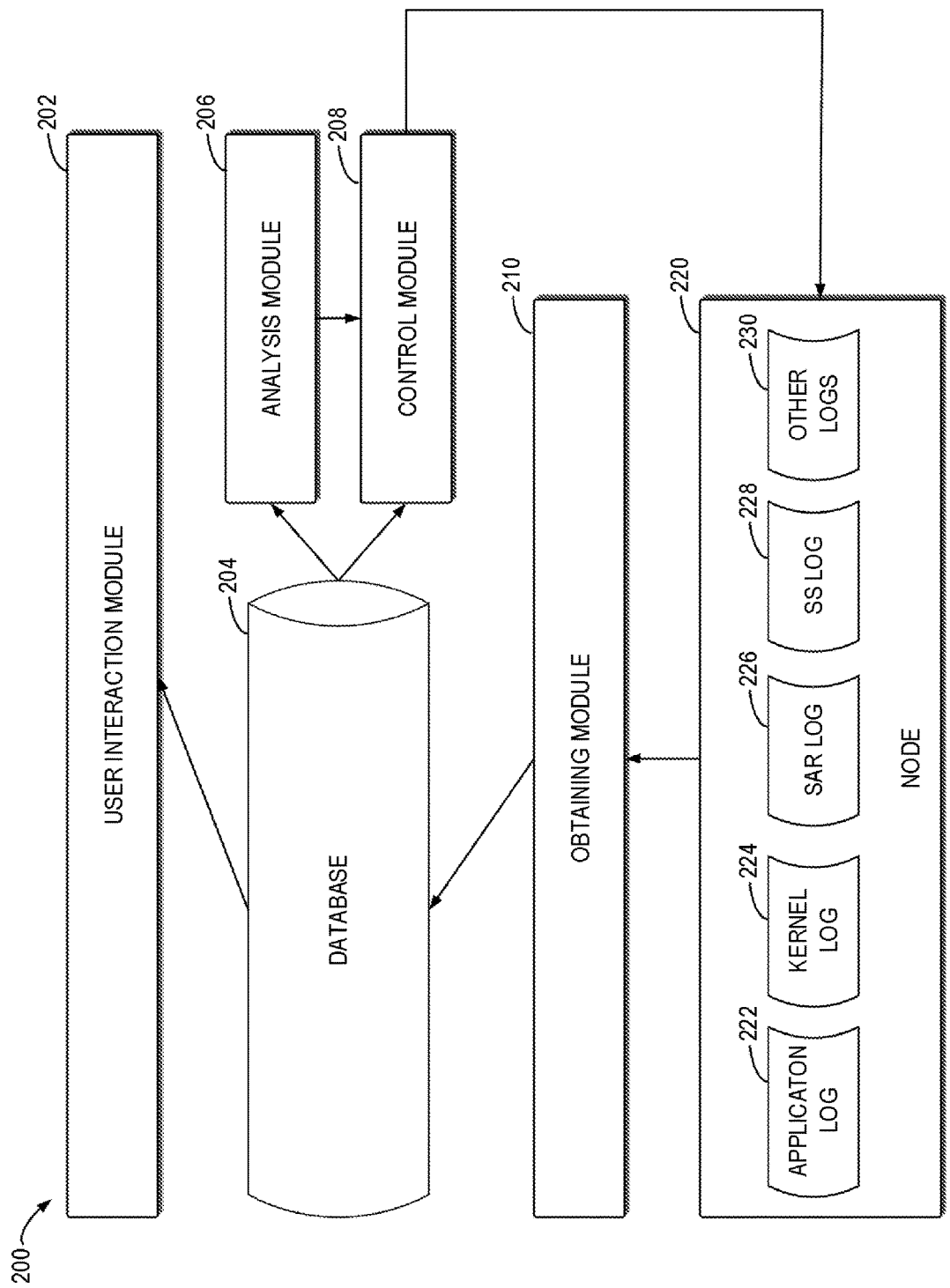
FIG. 2 illustrates a diagram of architecture of an example application monitoring system according to an embodiment of the present disclosure.

FIG. 2 illustrates a diagram of architecture of an example monitoring system 200 according to an embodiment of the present disclosure. As shown in FIG. 2, the monitoring system 200 may include one or more nodes 220 for executing an application. The node 220 may collect an application log 222, a kernel log 224, a system activity report (Sar) log 226, a socket statistics (SS) log 228, and other logs 230 associated with a specific access request.

The application log 222 refers to log information associated with various operations (e.g., creation of a request, scheduling of a request, a system call of a request and destruction of a request, etc.) of the access request at the application layer. For an entire life cycle of the access request, the application log 222 can only record an overall situation of the system call of the access request, and cannot obtain specific information of each stage of the access request in the kernel when the system call is executed. The pure application log 222 cannot effectively reflect problems that might exist in the kernel.

In some embodiments, the node 220 may obtain the log information of the access request at the application layer based on an identifier of the access request (e.g., an ID of the access request) by a conventional monitoring method, and add corresponding timestamps to these log information. It should be understood that any suitable monitoring technique may be employed to obtain the application log 222 corresponding to the access request, which is not described in detail herein.

A Sar log refers to log information used to characterize a current operation state of a system, such as read/write situation of a file, use of a system call, serial port, CPU efficiency, use of a memory, process activities and IPC-related activities and the like. An SS log refers to log information related to a system network status. Other logs 230 for example may include system error logs, security logs, and the like. It should be understood that any suitable technique may be used to obtain the node's Sar log 226, SS log 228, and other logs 230, which are not described in detail herein.

Figure 3:
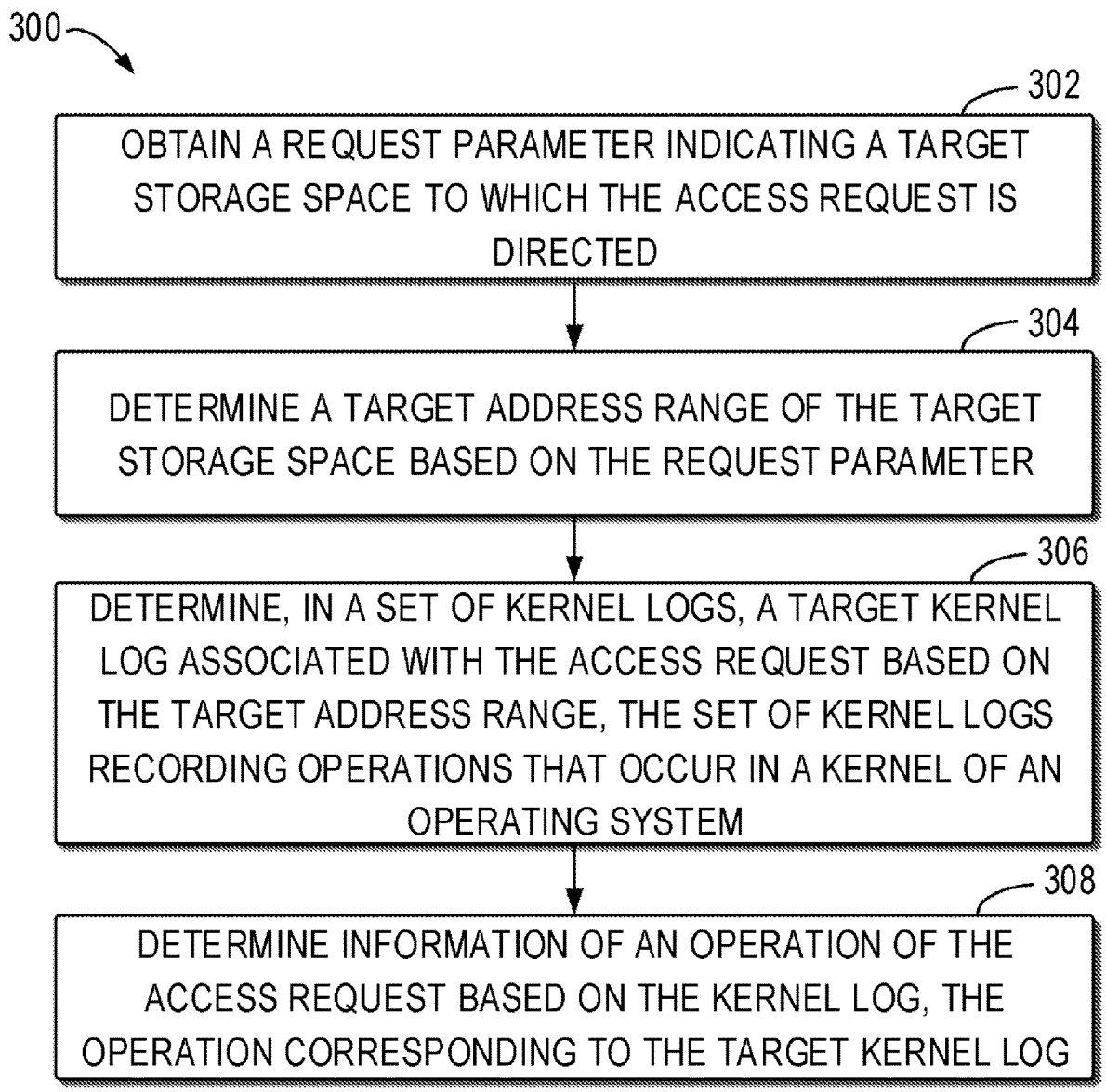
FIG. 3 illustrates a flow chart of a process of monitoring an application request according to an embodiment of the present disclosure.
Figure 4:
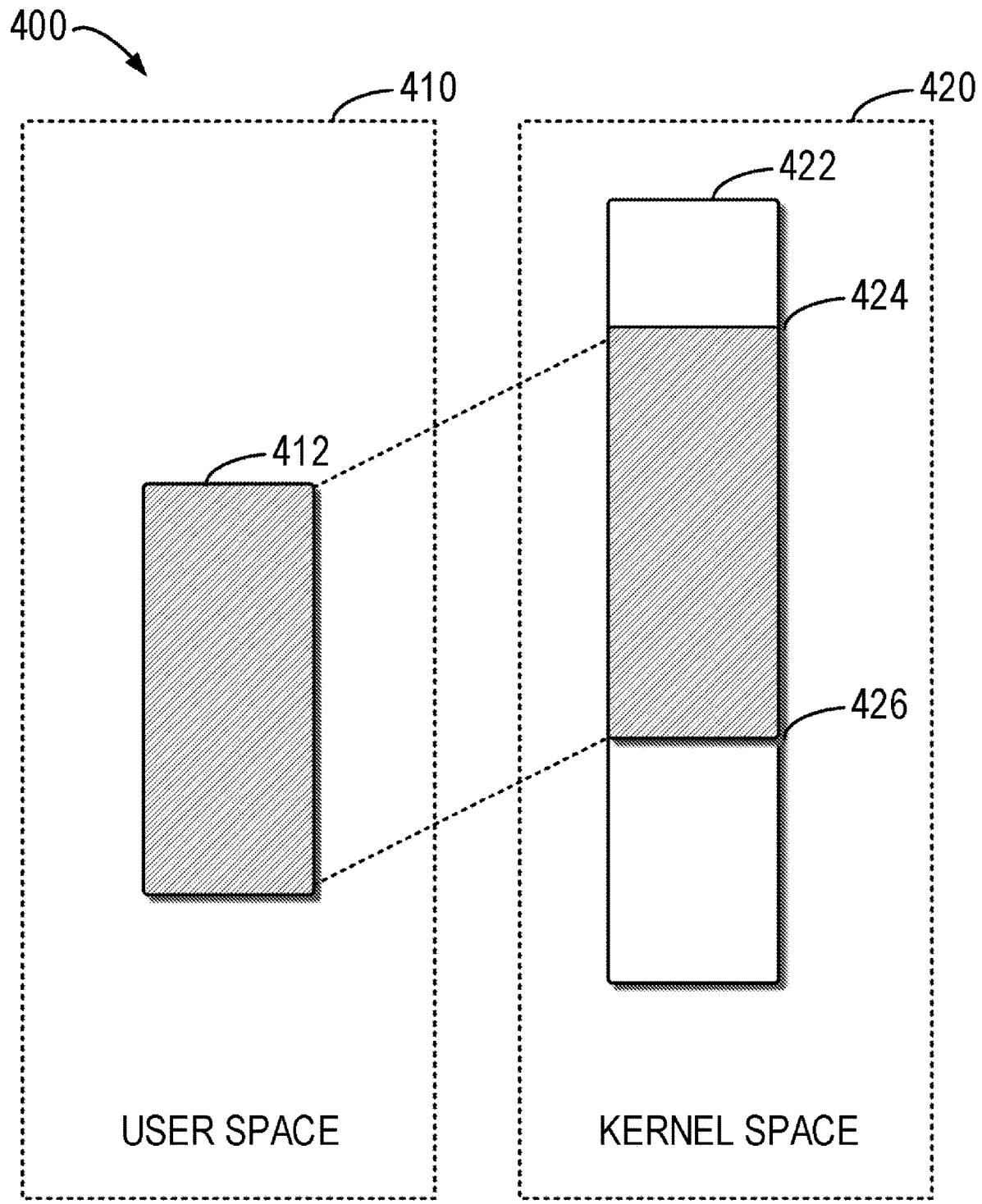
FIG. 4 illustrates a schematic diagram of determining a target address range according to an embodiment of the present disclosure.

The kernel log 224 refers to log information associated with an operation of the access request in the kernel, and a process of determining the kernel log 224 corresponding to the access request will be described in detail below with reference to FIGS. 3 through 4. FIG. 3 illustrates a flow chart of a process 300 of monitoring an application request according to an embodiment of the present disclosure. The process 300 may be implemented by the monitoring system 200 of FIG. 2. For ease of discussion, the process 300 will be described with reference to FIG. 2.

At block 302, the monitoring system 200 obtains a request parameter indicating a target storage space to which the access request is directed. In some embodiments, for a specific access request performed in the node 220, the monitoring system 200 may obtain a request parameter indicating the target storage space to which the access request is directed.

Specifically, in some embodiments, the monitoring system 200 may obtain a file identifier of a file to which the access request is directed, an offset of the target storage space in the file, and a size of the target storage space. For example, for a write request to write specific data to the target storage space, the access request may be expressed at the application layer as: write(fd, offset, buffer, size), wherein fd represents the file identifier of the file to which the write request is directed, the offset represents the offset of the target storage space in the file, the buffer indicates the data to be written in, and the size indicates the size of the data to be written in (i.e., the size of the target storage space).

At block 304, based on the request parameters, the monitoring system 200 determines a target address range of the target storage space. FIG. 4 illustrates a schematic diagram 400 for determining a target address range according to an embodiment of the present disclosure. As shown in FIG. 4, the data to be written by the access request may be represented as a data segment 412 in a user space. As described above, the target storage space to which the access request is directed may be indicated by the file identifier, offset, and size.

In some embodiments, specifically, the monitoring system 200 may obtain a file address range corresponding to the file identifier first based on the file identifier. For example, as shown in FIG. 4, the monitoring system 200 may determine a file address range 422 corresponding to the file identifier based on the file identifier. In some embodiments, a file system of the node 220 may maintain an Mode to store meta information of the file, and the meta information may include, but is not limited to, the number of bytes of the file, address space of the file, read/write permissions of the file, and the like. In some embodiments, the monitoring system 200 may determine a corresponding Mode based on the file identifier, and obtain address space information recorded in the Mode, thereby determining the file address range 422 corresponding to the file indicated by the file identifier in a kernel space 420.

In some embodiments, the monitoring system 200 may then determine a target address range from the file address range based on the offset and size. Continuing with the example of FIG. 4, after obtaining the file address range 422 corresponding to the file identifier, the monitoring system 200 may obtain a starting address 424 of the target address range by adding the offset to a starting address of the file address range 422, and obtain an ending address 426 of the target address range by adding the size of the target storage space to the starting address 424.

Still referring to FIG. 3, at block 306, based on the target address range, the monitoring system 200 determines, in a set of kernel logs, a target kernel log associated with the access request, wherein the set of kernel logs records operations that occur in a kernel of an operating system.

In some embodiments, specifically, the monitoring system 200 may obtain an address range (for convenience of description, hereinafter referred to as a first address range) associated with a kernel log (for convenience of description, hereinafter referred to as a first kernel log) in the set of kernel logs. As described above, the kernel 100 may divide the access request into a plurality of access requests for a single storage block at the generic block layer 140. In some embodiments, a single kernel log may record an address range of a single block to which an operation corresponding to the log is directed. Thus, for the first kernel log in the set of kernel logs, the monitoring system 200 may obtain, from the information recorded by the kernel log, the first address range of the storage block corresponding to the kernel log.

In some embodiments, subsequently, in response to the first address range being within the target address range, the monitoring system 200 may determine the first kernel log as the target kernel log. In some embodiments, after determining the first address range, the monitoring system 200 may compare the first address range with a previously-determined target address range to which the access request is directed. When the first address range is within the target address range, the monitoring system 200 may determine the first kernel log as being for an operation associated with the access request. In this manner, the monitoring system 200 may determine, from the set of kernel logs, different kernel logs corresponding to operations of different layers in the kernel.

At block 308, based on the kernel log, the monitoring system 200 determines information of an operation of the access request corresponding to the target kernel log. In some embodiments, after determining the kernel log corresponding to the access request, the monitoring system 200 may obtain, based on the kernel log, information associated with the corresponding operation. In some embodiments, the information that the monitoring system 200 may obtain from the kernel log includes at least one of the following: a status of the operation, a timestamp of the operation, and content of the operation. For example, the monitoring system 200 may obtain a timestamp corresponding to the kernel log, and determine time consumed by the operation based on the timestamps of the two adjacent operations. For example, the time consumed by the I/O scheduler layer 150 may be determined by a difference obtained by subtracting a kernel log timestamp of an event corresponding to the I/O scheduler layer 150 from a kernel log timestamp of an event corresponding to the block device driver layer 160.

Based on the above manner, the solution of the present disclosure may establish a mapping between an access request of application and a kernel log, thereby obtaining the information associated with each operation of the access request in the kernel, thereby implementing tracking of details of operations of the access request at various layers in the kernel, and providing a basis for thorough analysis of the application.

Still referring to FIG. 2, in some embodiments, after the monitoring system 200 collects the application log 222, kernel log 224, Sar log 226, SS log 228 and other logs 230 associated with the access request in the node 220, the node 220 may send the above log information to an obtaining module 210. In some embodiments, the obtaining module 210 may be located in a different computing device than the node 220. Alternatively, the obtaining module may also be located in a same node 220.

After the obtaining module 210 receives a plurality of kinds of log information, including the kernel log 224, from the node 220, the obtaining module 210 may store the above log information into a database 204. In some embodiments, the obtaining module 210 may receive log information from different nodes 220 and aggregate and store them into the database 204. By storing the log files into the database 204, there is no need for the monitoring system 200 to view log information at possibly multiple different nodes 220, thereby improving efficiency of monitoring a distributed application.

In some embodiments, an analysis module 206 in the monitoring system 200 may obtain, from the database 204, information corresponding to the access request. In some embodiments, the analysis module 206 may, determine, based on the obtained information, whether an abnormity occurs in the operation. For example, the analysis module 206 may determine time consumed by the access request in each stage based on a timestamp of the log in the application log 222 or the kernel log 224. In some embodiments, the monitoring system 200 may set a predetermined consumed time threshold for each stage, and the analysis module 206 may compare the consumed time determined through the log and the predetermined consumed time threshold, to determine whether an abnormality occurs in a corresponding stage. For example, when it is determined based on the kernel log that the consumed time of the I/O scheduler layer exceeds a predetermined threshold, the analysis module 206 may determine that there is a larger number of requests for the current node.

In some embodiments, the analysis module 206 may utilize an appropriate big data analysis engine to determine whether an abnormity occurs. In some embodiments, the analysis module 206 may also utilize a method, such as machine learning, to determine, based on a log, whether an abnormality occurs in each stage of the access request. It should be understood that after corresponding log information is obtained, any suitable manner may be used to determine whether an abnormality occurs in the operation of the access request in each stage, which will not be described herein in detail any more.

In some embodiments, in response to determining an occurrence of the abnormity in the operation, the monitoring system 200 may perform, based on a type of the abnormality, at least one predetermined action corresponding to the type. In some embodiments, the monitoring system 200 may set different types of policies for different types of abnormities, for example, for an abnormity of the I/O scheduler layer 150, the monitoring system 200 may set a policy of the number of requests for the node, thereby avoiding overload of the node. For example, for an abnormity of the block device layer 170, the monitoring system 200 may detect whether a bad driver appears. For example, when the abnormality of the I/O scheduler layer 150 is detected, the monitoring system 200 may reduce the number of requests for the node, for example, by a control module 208, thereby balancing load between the nodes to avoid performance degradation caused by overload of a single node.

In some embodiments, in response to determining an occurrence of the abnormity in the operation, the monitoring system 200 may provide an indication for the occurrence of the abnormity in the operation. In some embodiments, when the monitoring system 200 detects, based on the log information, that an abnormity occurs in the operation, the monitoring system 200 may send an indication for the occurrence of the abnormity in the operation to the user through a user interaction module 202. In some embodiments, the user interaction module 202 may send a corresponding prompt to a user by text, video, audio, vibration, or the like. For example, when the monitoring system 200 determines that an abnormality has occurred in the block device layer 170, the monitoring system 200 may send an indication of confirmation on whether a fault occurs in a driver to the user via the interaction module 202. After receiving the indication, the user may confirm whether the fault occurs in the driver, thereby replacing a possible bad driver in time.

In some embodiments, the monitoring system 200 may also provide a visualized display of information determined from the log. For example, the monitoring system 200 may display a graphical representation of consumed time of an access request at each stage of the kernel 100 to a user through the user interaction module 202 to enable the user to visually learn about a distribution of the consumed time of the access request at each stage of the kernel, thereby assisting the user in better monitoring whether a fault occurs, or optimizing a model.

Although in FIG. 2, the obtaining module 210, database 204, analysis module 206, control module 208 and user interaction module 202 are shown in different blocks of the node 220 for purposes of description. It should be understood that these modules may be implemented in a same computing device as the node 220 or a computing device different from the node 220, and embodiments of the present disclosure are not limited in this respect.

Figure 5:
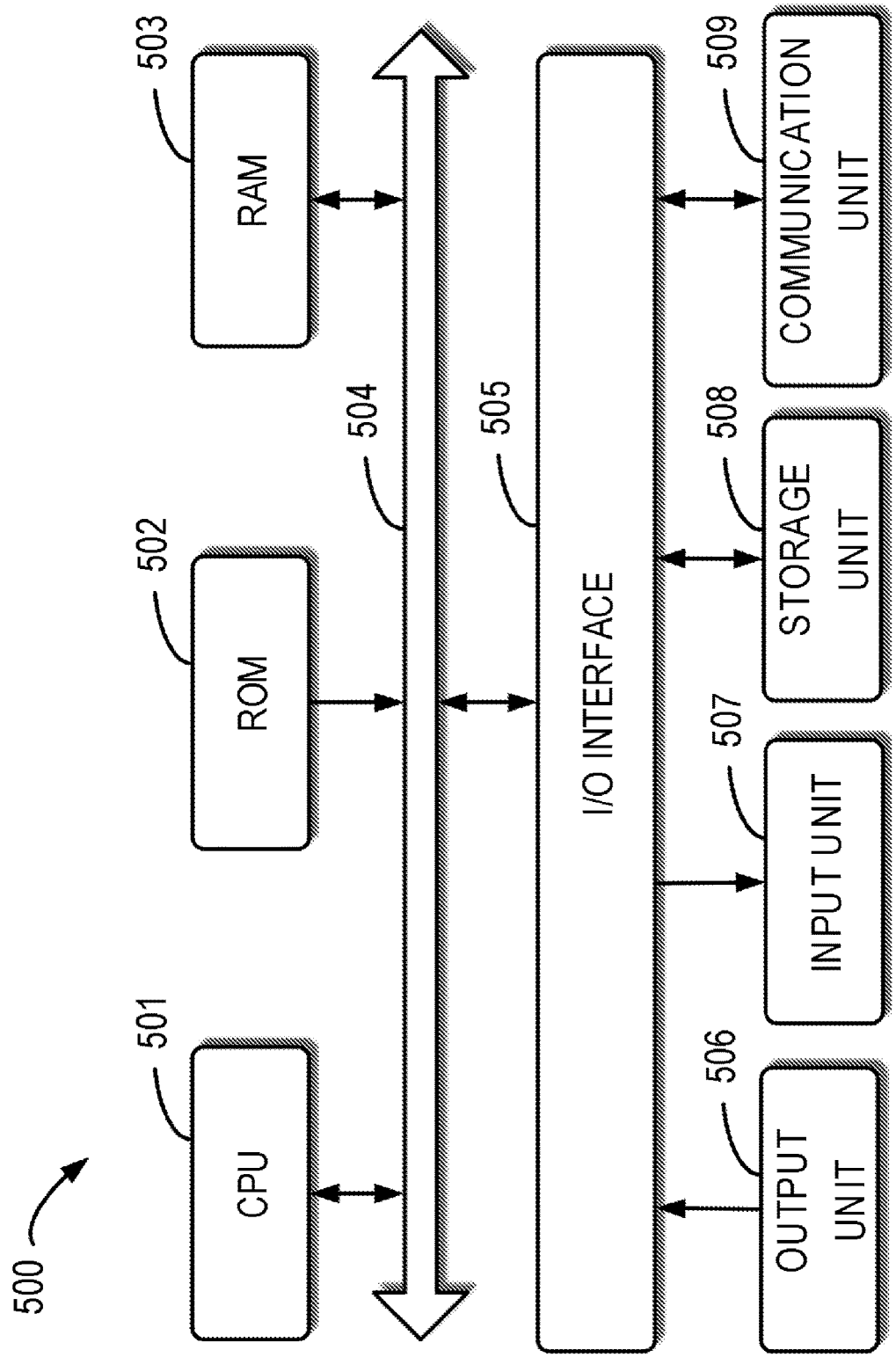
FIG. 5 illustrates a schematic block diagram of an example device that can be used to implement embodiments of the present disclosure.

FIG. 5 illustrates a schematic block diagram of an example device 500 that can be used to implement embodiments of the present disclosure. For example, the node 220 shown in FIG. 1 may be implemented by the device 500. As shown in FIG. 5, the device 500 includes a central processing unit (CPU) 501 which is capable of performing various processes in accordance with computer program instructions stored in a read only memory (ROM) 502 or computer program instructions loaded from a storage unit 508 to a random access memory (RAM) 503. Various programs and data as required by operation of the device 500 are stored in the RAM 503. The CPU 501, ROM 502 and RAM 503 are connected to one another via a bus 504. An input/output (I/O) interface 505 is also connected to the bus 504.

The following components in the device 500 are connected to the I/O interface 505: an input unit 506 including a keyboard, a mouse, or the like; an output unit 507 such as various types of displays and speakers; a storage unit 508 such as a magnetic disk or optical disk; and a communication unit 509 such as a network card, a modem, a wireless communication transceiver or the like. The communication unit 509 allows the device 500 to exchange information/data with other devices via a computer network such as the Internet and/or various telecommunication networks.

The processing unit 501 performs various method and processes described above, for example the method 300. For example, in some embodiments, the method 300 may be implemented as a computer software program, which is tangibly contained in a machine-readable medium, for example the storage unit 508. In some embodiments, part or the entire computer program may be loaded and/or installed on the device 500 via the ROM 502 and/or communication unit 509. When the computer program is loaded in the RAM 503 and executed by CPU 501, one or more acts of the method 300 described above may be executed.

The present disclosure may be a method, a device, a system and/or a computer program product. The computer program product may include a computer-readable medium on which computer-readable program instructions for executing various aspects of the present disclosure are embodied.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processing unit of a general purpose computer, special purpose computer, or other programmable data processing apparatus to produce a machine, such that the instructions, which execute via the processing unit of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method, comprising:
    obtaining, by a system comprising a processor, a request parameter indicating a target storage space to which an access request is directed;
    determining a target address range of the target storage space based on the request parameter;
    determining, in a set of kernel logs, a target kernel log associated with the access request based on the target address range, the set of kernel logs recording operations that occur in a kernel of an operating system;
    determining information of an operation of the access request based on the target kernel log, the operation corresponding to the target kernel log, wherein the information comprises a timestamp of the operation;
    determining, based on the timestamp, whether an abnormity has occurred in the operation; and
    in response to determining the abnormity has occurred, setting, based on a type of the abnormity of the operation, at least one policy to reduce a performance degradation caused by an overload of a node.

2. The method according to claim 1, wherein the obtaining the request parameter comprises:
    obtaining a file identifier of a file to which the access request is directed, an offset of the target storage space in the file, and a size of the target storage space.

3. The method according to claim 2, wherein the determining the target address range comprises:
    obtaining a file address range corresponding to the file based on the file identifier; and
    determining, from the file address range, the target address range based on the offset and the size.

4. The method according to claim 1, wherein the determining the target kernel log comprises:
obtaining a first address range associated with a first kernel log of the set of kernel logs; and
in response to the first address range being within the target address range, determining the first kernel log as the target kernel log.

5. The method according to claim 1, wherein the information is of a first type of information, and the method further comprises:
determining a second type of information of the operation of the access request based on the target kernel log, the operation corresponding to the target kernel log, and wherein the second type of information includes at least one of the following: a status of the operation, and content of the operation.

6. The method according to claim 1, further comprising:
in response to determining the abnormity occurred, providing an indication for the occurrence of the abnormity in the operation.

7. The method according to claim 1, further comprising:
providing a visualized display of the timestamp.

8. A device, comprising:
at least one processing unit;
at least one memory coupled to the at least one processing unit and having instructions stored therein, the instructions, when executed by the at least one processing unit, causing the device to perform acts comprising:
obtaining a request parameter indicating a target storage space to which the access request is directed;
determining a target address range of the target storage space based on the request parameter;
determining, in a set of kernel logs, a target kernel log associated with the access request based on the target address range, the set of kernel logs recording operations that occur in a kernel of an operating system;
determining information of an operation of the access request based on the target kernel log, the operation corresponding to the target kernel log, wherein the information comprises a timestamp of the operation;
determining, based on the timestamp, whether an abnormity occurred in the operation; and
in response to determining the abnormity occurred, setting at least one policy to reduce a performance degradation caused by an overload of a node.

9. The device according to claim 8, wherein the obtaining the request parameter comprises:
obtaining a file identifier of a file to which the access request is directed, an offset of the target storage space in the file, and a size of the target storage space.

10. The device according to claim 9, wherein the determining the target address range comprises:
obtaining a file address range corresponding to the file based on the file identifier; and
determining, from the file address range, the target address range based on the offset and the size.

11. The device according to claim 8, wherein the determining the target kernel log comprises:
obtaining a first address range associated with a first kernel log of the set of kernel logs; and
in response to the first address range being within the target address range, determining the first kernel log as the target kernel log.

12. The device according to claim 8, wherein the information is of a first type of information, and the acts further comprise:
determining a second type of information of the operation of the access request based on the target kernel log, the operation corresponding to the target kernel log, and wherein the second type of information includes at least one of the following: a status of the operation, the timestamp of the operation, and content of the operation.

13. The device according to claim 8, the acts further comprising:
in response to determining the abnormity occurred, performing, based on a type of the abnormity of the operation, at least one predetermined action corresponding to the type.

14. The device according to claim 8, the acts further comprising:
providing a visualized display of the timestamp.

15. A computer program product being stored on a non-transitory computer storage medium and comprising machine-executable instructions which, when executed in a device, cause the device to perform operations, comprising:
obtaining a request parameter indicating a target storage space to which the access request is directed;
determining a target address range of the target storage space based on the request parameter;
determining, in a set of kernel logs, a target kernel log associated with the access request based on the target address range, the set of kernel logs recording operations that occur in a kernel of an operating system;
determining information of an operation of the access request based on the target kernel log, the operation corresponding to the target kernel log, wherein the information comprises a timestamp of the operation; and
in response to determining, based on the timestamp, an occurrence of an abnormity in the operation,
providing an indication for the occurrence of the abnormity in the operation, and
setting, based on a type of the abnormity of the operation, at least one policy to avoid a performance degradation caused by an overload of a node.

16. The computer program product according to claim 15, wherein the obtaining the request parameter comprises:
obtaining a file identifier of a file to which the access request is directed, an offset of the target storage space in the file, and a size of the target storage space, and wherein the determining the target address range comprises:
obtaining a file address range corresponding to the file based on the file identifier; and
determining, from the file address range, the target address range based on the offset and the size.

17. The computer program product according to claim 15, wherein the determining the target kernel log comprises:
obtaining a first address range associated with a first kernel log of the set of kernel logs; and
in response to the first address range being within the target address range, determining the first kernel log as the target kernel log.

18. The computer program product according to claim 15, wherein the performing operations comprises:
based on the abnormity being with respect to a block device layer, detecting whether a bad driver appears.

19. The computer program product according to claim 15, wherein the operations further comprise:
sending the indication for the occurrence of the abnormity in the operation to a user device via a user interaction module.

20. The computer program product according to claim 15, wherein the providing of the indication comprises providing a visual display of log information determined from the target kernel log.

* * * * *